United States Patent
Iellimo

(10) Patent No.: US 11,730,266 B2
(45) Date of Patent: Aug. 22, 2023

(54) ALIGNMENT METHOD AND INSTALLATION TOOL

(71) Applicant: FRAZIER INDUSTRIAL COMPANY, Long Valley, NJ (US)

(72) Inventor: Aaron Iellimo, Califon, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 120 days.

(21) Appl. No.: 17/510,897

(22) Filed: Oct. 26, 2021

(65) Prior Publication Data

US 2022/0039553 A1 Feb. 10, 2022

Related U.S. Application Data

(63) Continuation of application No. 16/656,827, filed on Oct. 18, 2019, now Pat. No. 11,185,163.

(51) Int. Cl.
*A47B 96/06* (2006.01)
*A47B 47/02* (2006.01)

(52) U.S. Cl.
CPC .......... *A47B 96/068* (2013.01); *A47B 47/021* (2013.01); *F16M 2200/08* (2013.01)

(58) Field of Classification Search
CPC . F16M 2200/08; E04B 1/4157; A47B 96/068; A47B 47/021; B25B 27/14; B65G 1/02
USPC .................................. 52/169.6, 211, 745.17
See application file for complete search history.

(56) References Cited

U.S. PATENT DOCUMENTS

| | | | |
|---|---|---|---|
| 1,963,242 A | 6/1934 | Nelson | |
| 4,372,585 A | 2/1983 | Evora | |
| 4,915,033 A * | 4/1990 | Bond | B65D 19/44 108/55.1 |
| 4,932,818 A * | 6/1990 | Garwood | E04B 1/4157 411/397 |
| 4,977,836 A * | 12/1990 | Bond | B65D 19/44 248/346.02 |
| 5,160,231 A | 11/1992 | Miller | |
| 5,865,490 A | 2/1999 | Vowell | |
| 6,241,228 B1 * | 6/2001 | Chupick | B23Q 1/009 269/48.1 |
| 7,044,066 B1 | 5/2006 | Miller | |
| 7,066,697 B2 | 6/2006 | Guilkey | |
| 7,104,514 B2 | 9/2006 | Ciarlo | |
| 7,293,483 B1 | 11/2007 | Hutchings et al. | |

(Continued)

FOREIGN PATENT DOCUMENTS

EP 1217147 A2 6/2002

*Primary Examiner* — Brian E Glessner
*Assistant Examiner* — Adam G Barlow
(74) *Attorney, Agent, or Firm* — Dilworth & Barrese, LLP

(57) ABSTRACT

An alignment tool and method that is easy to use during the installation of a base of a commercial storage rack over bolts extending up from a warehouse floor. The alignment tool comprises a cylindrical body having a first conically shaped upper end and a second lower end having a bolt receiving hollow opening therein. The opening extends up into said cylindrical body along a longitudinal axis of the body. The method includes placing the opening down over the bolts, with the conical top facing up, to protect the bolts and align the base as it is lowered over the bolts. The alignment tool can be easily removed, prior to bolting the base to the floor, such as with a removal tool through a hole in the alignment tool.

20 Claims, 13 Drawing Sheets

(56) References Cited

U.S. PATENT DOCUMENTS

| | | | |
|---|---|---|---|
| 8,152,828 B2 | 4/2012 | Taylor et al. | |
| 8,850,765 B2* | 10/2014 | Amengual Pericas | ..................... |
| | | | E01F 15/0476 |
| | | | 52/169.9 |
| 9,200,663 B2* | 12/2015 | Ryan | ....................... F16B 37/14 |
| 9,347,232 B1 | 5/2016 | Francies, III | |
| 10,094,101 B1* | 10/2018 | Jazzar | ....................... E04C 3/34 |
| 10,260,224 B1* | 4/2019 | Jazzar | ..................... E04G 11/38 |
| 10,569,411 B1* | 2/2020 | Schulz | ..................... B25H 1/10 |
| 2005/0120666 A1* | 6/2005 | Alyea | .................. E04B 1/4157 |
| | | | 52/698 |
| 2006/0016140 A1 | 1/2006 | Smith | |
| 2006/0042166 A1 | 3/2006 | Berklich, Jr. et al. | |
| 2007/0221596 A1 | 9/2007 | Rioux | |
| 2010/0080667 A1* | 4/2010 | Reed | ....................... F16B 37/14 |
| | | | 411/373 |
| 2011/0048175 A1 | 3/2011 | Levert | |
| 2013/0051953 A1* | 2/2013 | Ryan | .................... E04B 1/4157 |
| | | | 411/372.6 |

* cited by examiner

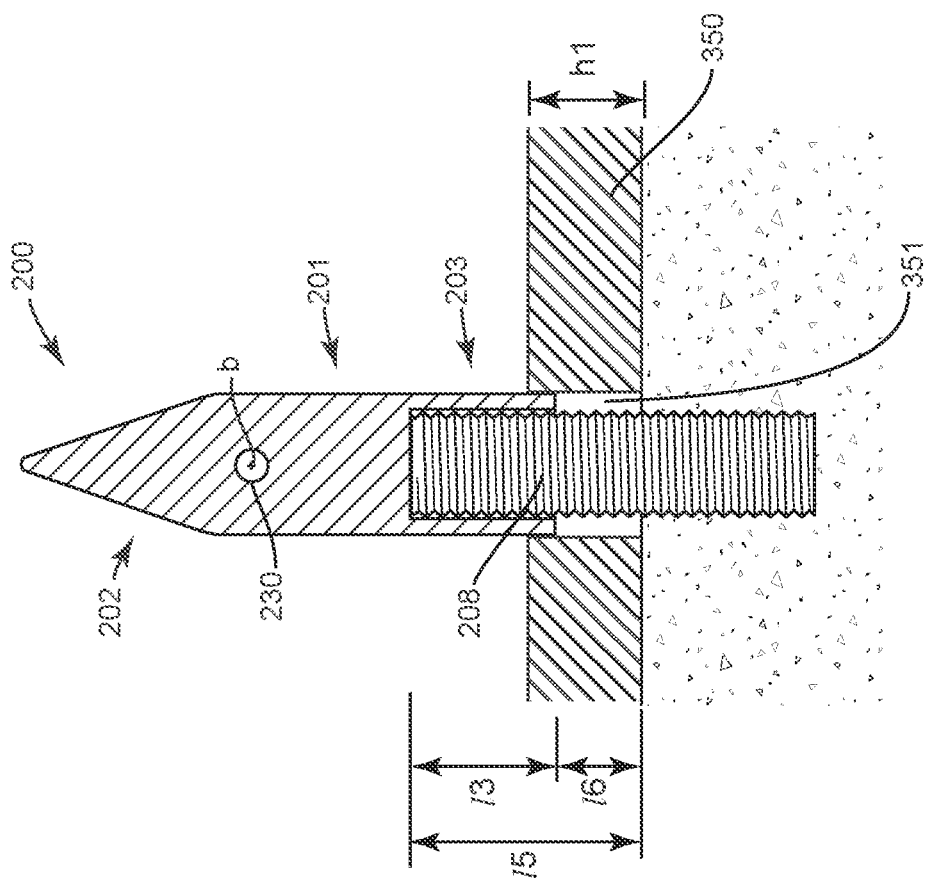
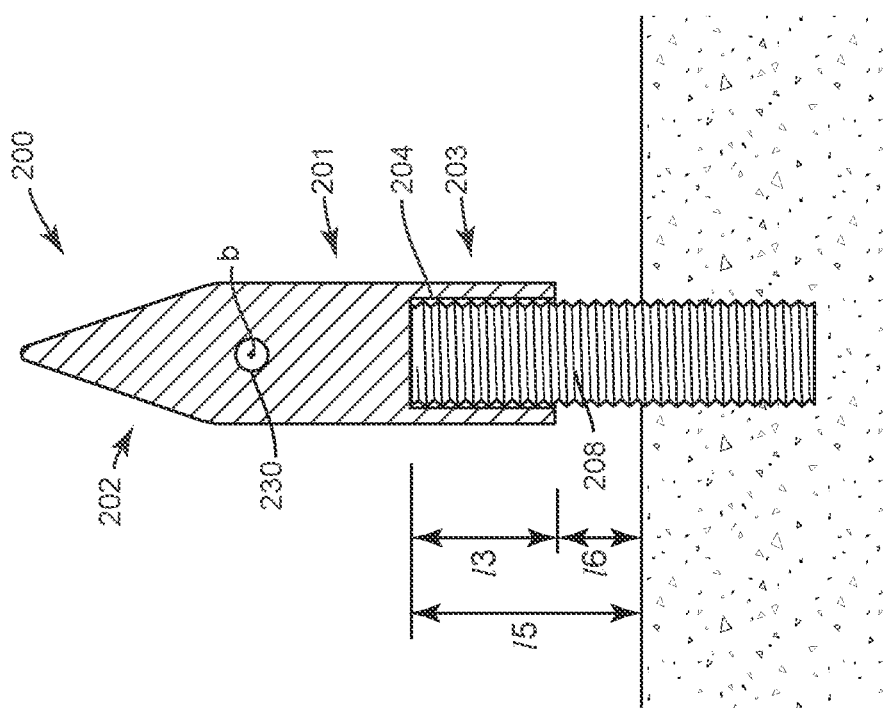

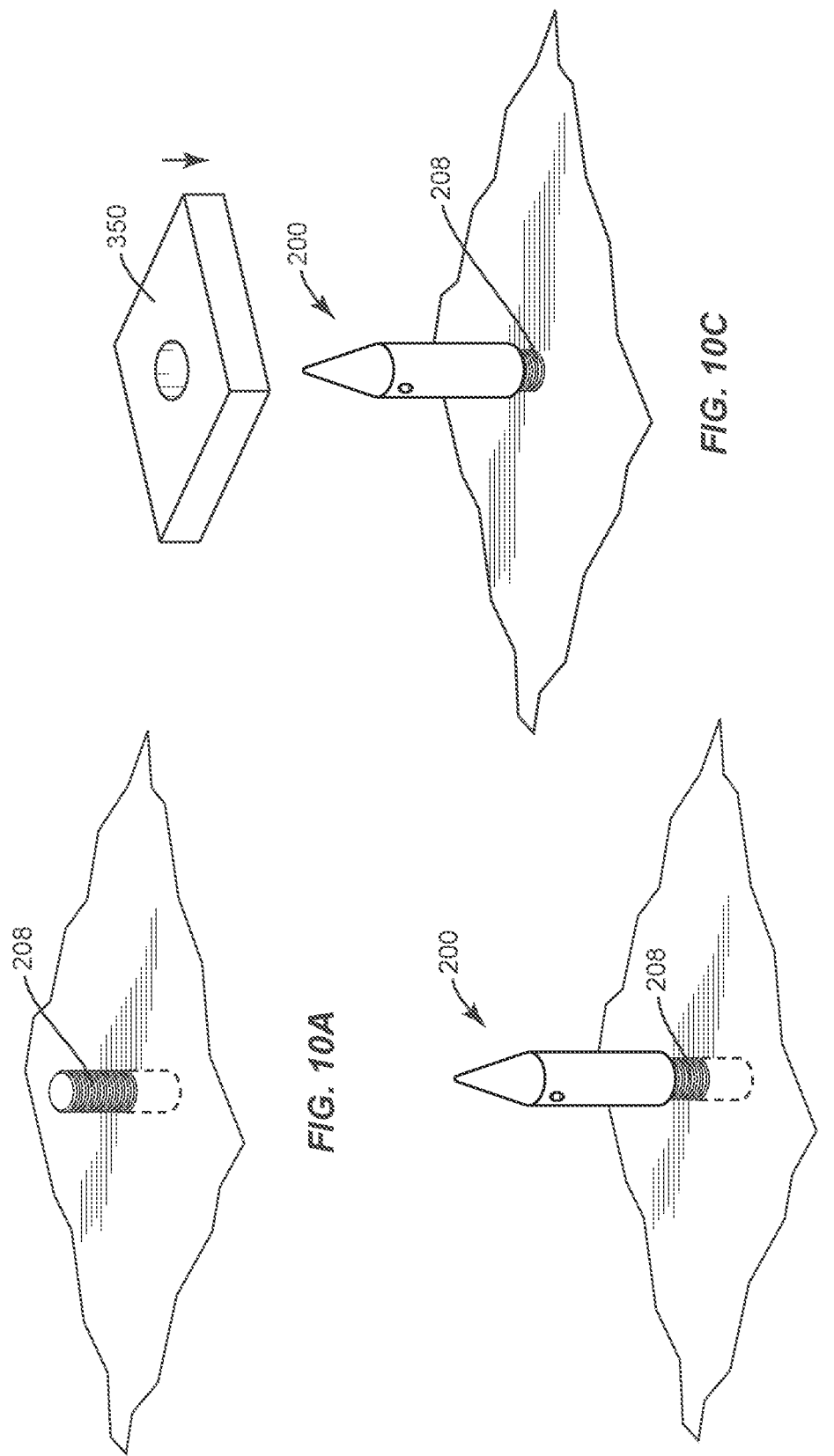

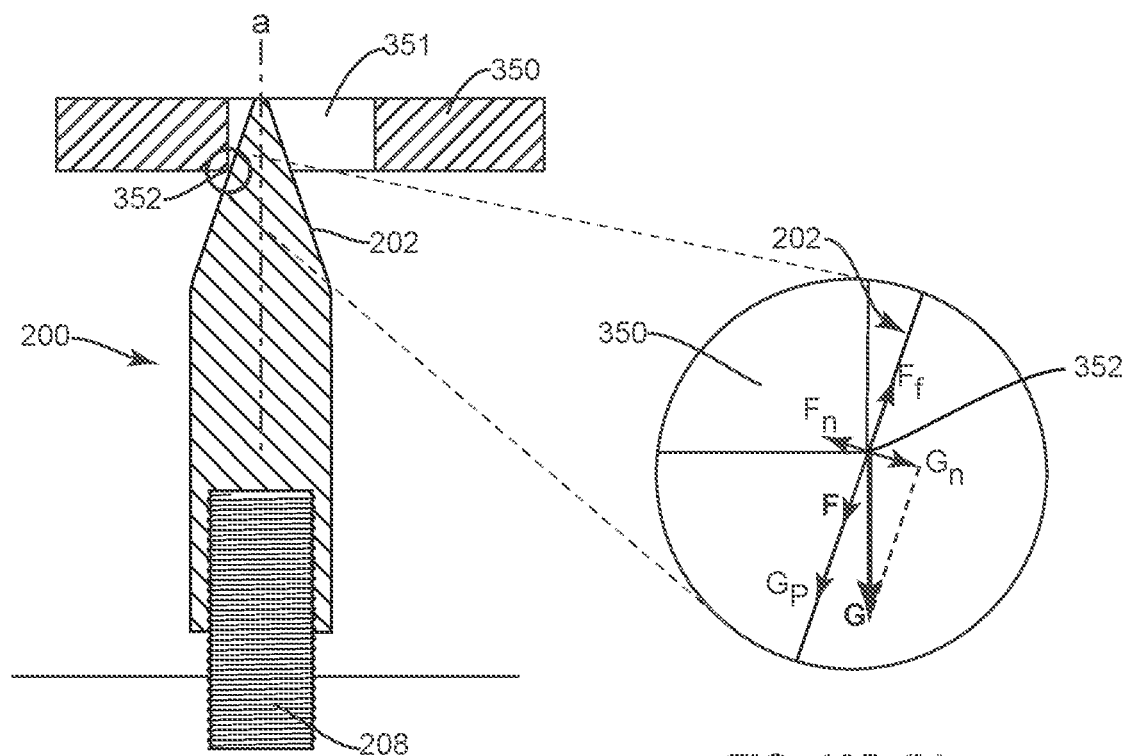
FIG. 10D (a)
FIG. 10D (b)
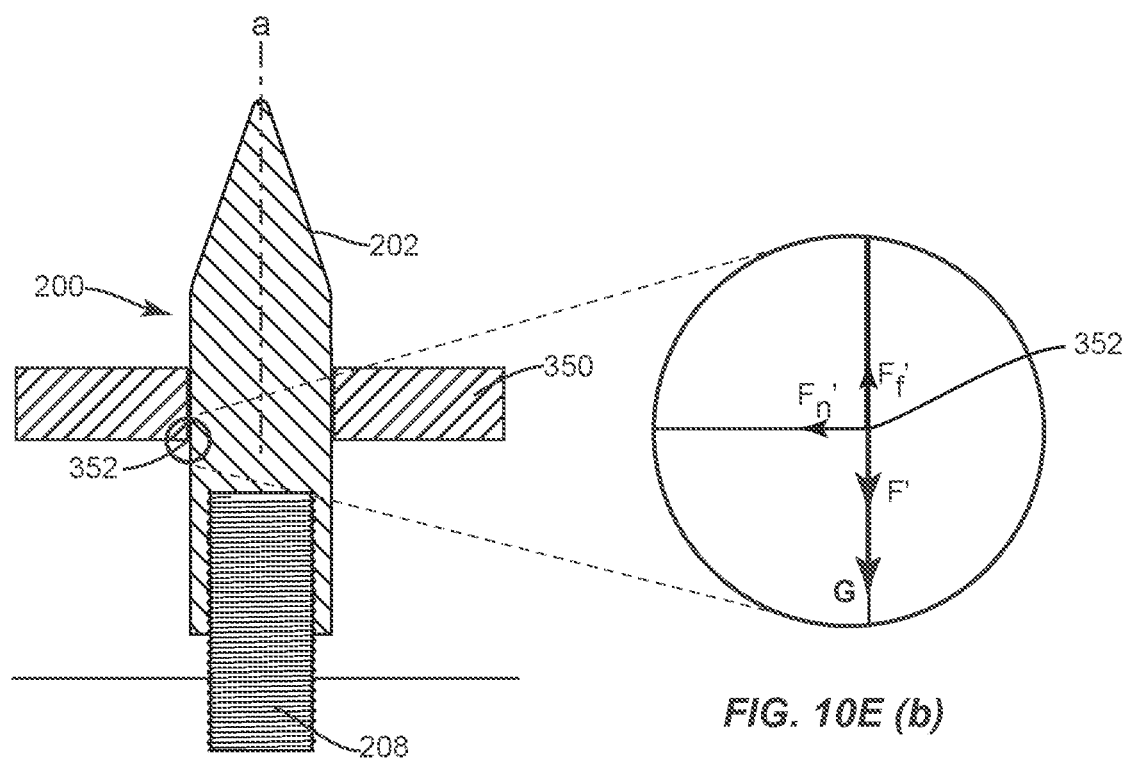
FIG. 10E (a)
FIG. 10E (b)

ALIGNMENT METHOD AND INSTALLATION TOOL

CROSS REFERENCE TO RELATED APPLICATIONS

This application claims priority as a continuation of application Ser. No. 16/656,827, filed Oct. 18, 2019, the contents of which are incorporated herein by reference in their entirety.

BACKGROUND

Storage systems are used in warehouses, department stores, and storage facilities to store products thereon. Storage systems containing a plurality of storage racks may hold and support large amounts and often heavy materials. Storage racks often employ a number of vertical columns that are sturdily positioned on a base or floor, and then a plurality of horizontal supporting beams may connect to and be fastened to the vertical columns. Storage racks can be 1, 2, or more levels high. Some racks have 5, 6 or more levels. Pallets of goods weighing up to 3000 lbs. or more each can be stored on these racks. Deep storage systems can be 10, 20 or more pallets deep. Accordingly, these racks commonly hold huge loads that are often constantly shifting as pallets are moved to different locations in a warehouse by forklifts, automated pallet carts and otherwise.

According to safety law and regulations, storage racks must be secured safely to increase their stability and decrease the chance of collapsing. For example, anchor bolts may be installed through predrilled holes on the base plates of the storage rack and into the floor. A portion of the aboveground bolt, is used together with nuts and washers to secure the storage racks. The racks may also be secured to the adjacent wall or to each other. Heavy duty storage racks may require additional safety measurements to secure the racks to the floor.

In some warehouses, the threaded anchor bolts are fixed in ground before the installation of the storage racks. These fixed in ground anchor bolts provide strong support for the storage rack. One example is a cast-in-place anchor bolt, wherein the anchor bolt is cast in the wet concrete before the concrete sets. The portion of the cast-in-place anchor bolt that is embedded in the concrete may have the shape of straight (with an optional hex nut), J, L or pigtail. The portion of the cast-in-place anchor bolt that is above the ground is generally a straight post with nut receiving threads.

In other warehouses, straight anchor bolts may also be installed in the pre-existing floor by drilling holes having a diameter that is slightly larger than the diameter of the bolt and then applying an adhesive material, such as epoxy resin or polyurethane, to secure the lower portion of the bolt into the floor. These straight fixed-in-ground anchor bolts can be flexibly installed at any time into the pre-existing floor, making them more practical than these cast-in-place anchor bolts.

During installation of the storage rack, the aboveground portion of the fixed-in-ground anchor bolts are carefully aligned with the holes on the base plates of the storage rack, and then the storage rack is lowered to be placed on the floor while the anchor bolts are inserted through the holes through the base plates of the storage rack. However, because the holes on the base plates of the storage rack are only slightly larger than the diameter of the anchor bolts, and because these base plates are very heavy, often up to and over 1000 lbs., the bolts can easily be damaged during the installation of storage rack base plate, especially by heavy-duty storage racks that may weigh over one thousand pounds, i.e., several thousand pounds.

The installation of large and heavy storage racks often requires the precise alignment of multiple holes with multiple corresponding bolts at the same time, which can be very time consuming and any misalignment could significantly increase the chance of damage to the anchor bolts. For example, the thread on the anchor bolt may be damaged or stripped, or the bolt itself may be bent or broken by the heavy storage rack base.

Whether the damage to the bolts is significant depends on the type of damage. The bolts may need to be rethreaded with a rethreading kit or straightened with a tool. However, if the damages are so severe that the bolts cannot be repaired, a replacement of the anchor bolt would be required. In that situation, the anchor bolts would have to be removed from the floor, potentially causing major damage to the floor. While it is possible to reinstall a new bolt at the same location after the removal of the damaged bolt, due to the weakened structure of the floor, the same spot may not be suitable for the replacement bolt, and the change of location of one bolt in a set of multiple bolts would require the rest of bolts to be relocated accordingly.

Therefore, there is need to protect the aboveground portion of anchor bolts during the installation of storage rack base plates to avoid costly repair or replacement of the anchor bolts. There is also a need to improve the efficiency of the alignment process during the installation of storage racks.

SUMMARY

An alignment method and tool that is easy to use and provides protection to the fixed in ground threaded anchor bolts is disclosed herein.

In one embodiment, the alignment tool comprises three parts: a first solid body having a substantially conical or tapered shape with a round/smooth apex, a circular body gradually expanding from the apex and a flat circular base portion terminating the circular body of the first solid body, wherein the center of the apex and the center of the flat circular base lie substantially along a longitudinal axis of the alignment tool; a second solid body having an elongated tubular body extended from the flat circular base of the first solid body in an opposite direction of the round apex of the first solid body and along the longitudinal axis defined by the first solid body; and a hollow body having a substantially cylinder body extended from the second solid body in an opposite direction of the round apex of the first solid body, along the longitudinal axis defined by the first solid body and terminated at a circular ring and a hollow space having a substantially cylindrical shape encompassed by the hollow body.

The installation method involves sliding or screwing the alignment tool over a portion of an anchor bolt extending from the floor, then lowering the base plate, such that the anchor bolt receiving holes of the base plate are guided by the alignment tool over the alignment tool and thereby over the anchor bolts. The alignment tool is then removed and the base can be bolted to the anchor bolts.

In another embodiment, the alignment tool has a substantially cylindrical body defined along a longitudinal axis and comprises a first end having a conical shape and a second end defining an opening therein, and the opening extends into the substantially cylindrical body of the alignment tool along the longitudinal axis.

In another embodiment of the invention, the portion of the opening closest to the tip of the alignment tool is not flat, e.g. convex away from the tip, such that the alignment tool does not make substantial contact with the top face of the anchor bolt. This helps prevent the tip of the anchor bolt from being damaged by the inside surface of the alignment tool if the base plate strikes the alignment tool, if such impact were to be transferred to the tip of the anchor bolt.

BRIEF DESCRIPTION OF THE DRAWINGS

FIG. 9A is a cross sectional view of one embodiment of an alignment tool being placed on a threaded anchor bolt in accordance with aspects of the present disclosure;

FIG. 9B is a cross sectional view of a storage rack being installed through one embodiment of an alignment tool in accordance with aspects of the present disclosure;

FIGS. 10A-10G illustrate the method of using one embodiment of an alignment tool in the installation and fastening of a storage rack, in accordance with aspects of the invention. Specifically, FIG. 10A illustrates a threaded anchor bolt being deeply embedded in the floor; FIG. 10B illustrates an alignment tool in accordance with aspects of the present disclosure is being placed on a threaded anchor bolt; FIG. 10C illustrates a storage rack being aligned with and ready to be lowered over the tip of the alignment tool; FIG. 10D(a) illustrates the alignment tool and the threaded anchor bolt in accordance with aspects of the present disclosure being aligned off-center with a bolt receiving hole on a storage rack; FIG. 10D(b) is a force diagram to illustrate the forces acting on the alignment tool by the storage rack as it is lowered; FIG. 10E(a) illustrates a cross sectional view of a storage rack being installed over the body of the alignment tool in accordance with aspects of the present disclosure; FIG. 10E(b) is a force diagram to illustrate the forces acting on the alignment tool by the storage rack; FIG. 10F shows a storage rack being placed on the floor, over a threaded anchor bolt, without having damaged the threaded anchor bolt; FIG. 10G shows an anchor bolt after the alignment tool is removed, with a nut screwed onto the anchor bolt to secure the storage rack to the floor.

The figures are for purposes of illustration and are not intended to limit the scope or aspects of the invention.

DETAILED DESCRIPTION

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

Figure 1:
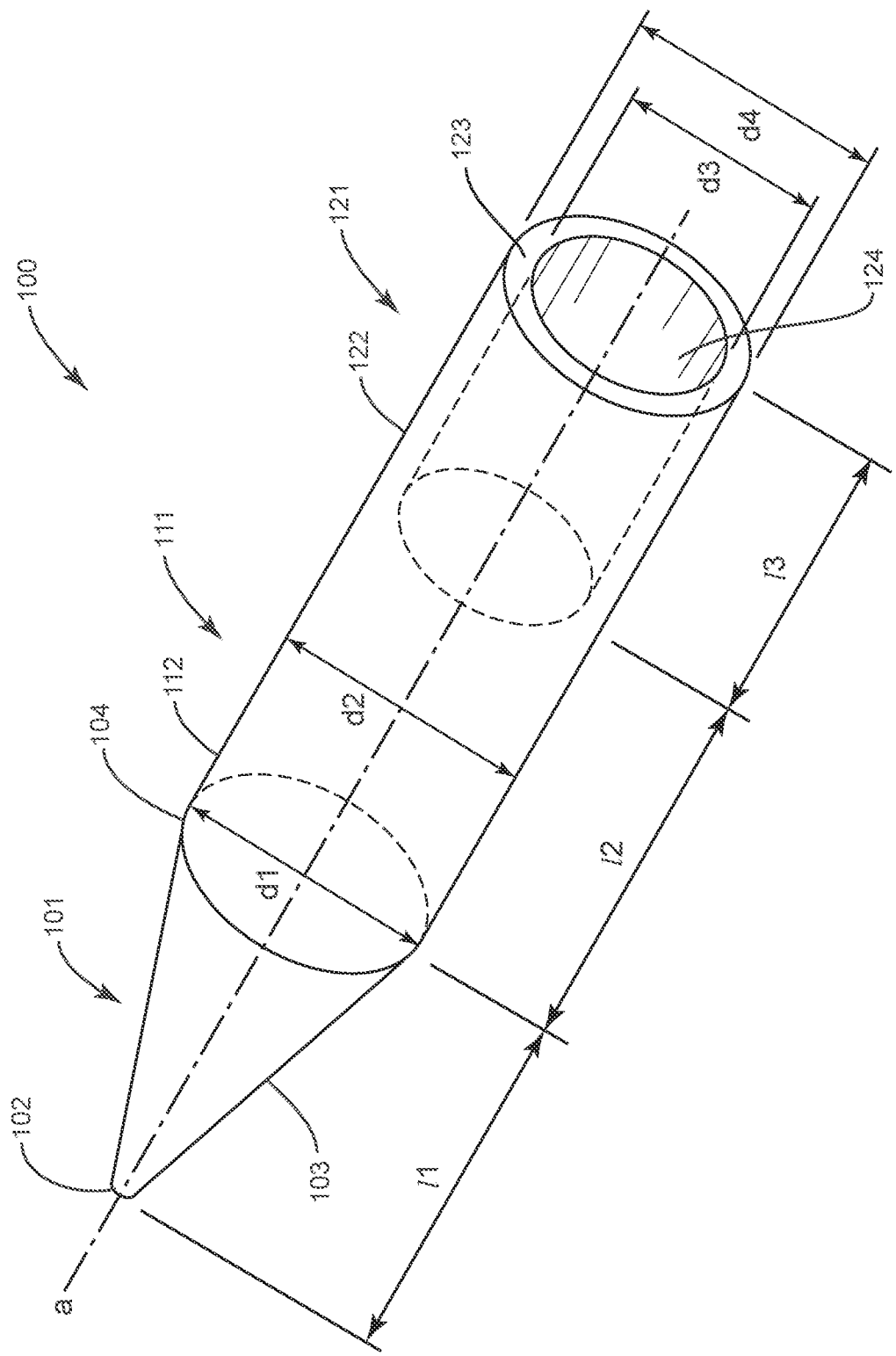
FIG. 1 is a perspective view illustrating a first embodiment of an alignment tool in accordance with aspects of the present disclosure.

FIG. 1 illustrates a first embodiment of an alignment tool in accordance with aspects of the present disclosure. The alignment tool 100 includes a first solid body 101, a second solid body 111 and a hollow body 121.

The first solid body 101 has a substantially conical shape with a round apex 102, a circular body 103 gradually expanding from the round apex 102 and a flat circular base 104 terminating the circular body 103 of the first solid body 101. Those skilled in the art will appreciate that apex 102 does not necessarily need to be round, but should be smooth, as pointed or jagged surfaces can lead to injury. First solid body 101 should taper out from apex 102. The center of the round apex 102 and the center of the flat circular base 104 preferably lie substantially along a longitudinal axis "a" of the alignment tool 100.

The second solid body 111 has an elongated tubular body 112 extended from the flat circular base 104 of the first solid body 101 in an opposite direction of the round apex 102 of the first solid body 101 and along the longitudinal axis "a" defined by the first solid body 101. An upward direction can be defined along axis a in a direction from base 104 towards apex 102.

A hollow body 121 includes a substantially cylinder body 122 which extends from second solid body 111 in a downward direction opposite from the direction of round apex 102 of the first solid body 101, along longitudinal axis "a." Hollow body 121 terminates at a circular ring 123 at its downward end. Hollow body 121 encompasses a hollow space 124 which has a substantially cylindrical shape defined by cylinder body 122.

The length l1 of the first solid body 101 of the alignment tool 100 is defined by the shortest distance along axis a from the center of the round apex 102 of the first solid body 101 to the center of the flat circular base 104 of the first solid body 101. The length l1 is preferably in the range of from 0.5 to 15 inches, more preferably, from 1 to 10 inches.

The length l2 of the second solid body 111 of the alignment tool 100 is defined by the shortest distance along axis a from the center of the flat circular base 104 of the first solid body 101 along the longitudinal axis "a" to the intersection of the second solid body 111 and the hollow body 121. The length l2 is in the range of from 0.1 to 10 inches and preferably, from 0.2 to 8 inches.

The length l3 of the hollow body 121 of the alignment tool 100 is defined by the shortest distance along the longitudinal axis "a" from the intersection of the second solid body 111 and the hollow body 121 to the center of the circular ring 123 of the hollow body 121. The length l3 is in the range of from 0.5 to 10 inches and preferably, from 1 to 8 inches.

The diameter d1 of the flat circular base 104 of the first solid body 101 is in the range of from 0.1 to 5 inches and preferably, from 0.2 to 4 inches, most preferably 0.5 to 2 inches.

The diameter d2 of the tubular body 112 of the second solid body 111 is in the range of from 0.1 to 5 inches and preferably, from 0.2 to 4 inches, most preferably 0.5 to 2 inches.

The diameter d3 of the inner surface of the hollow body 121, which is the same as the diameter of the outer surface of the hollow space 124, is in the range of from 0.05 to 5 inches and preferably, from 0.1 to 4 inches, most preferably 0.5 to 2 inches.

The diameter d4 of the outer surface of the hollow body 121 is in the range of from 0.1 to 5 inches and preferably, from 0.2 to 4 inches.

The diameter d1 of the flat circular base 104 of the first solid body 101 should be substantially the same as the diameter d2 of the tubular body 112 of the second solid body 111 and the diameter d4 of the outer surface of the hollow body 121.

The diameter d3 of the inner surface of the hollow body 121 is slightly larger than the diameter of the threaded anchor bolt (not shown in FIG. 1) to receive and protect the anchor bolt.

Figure 2:
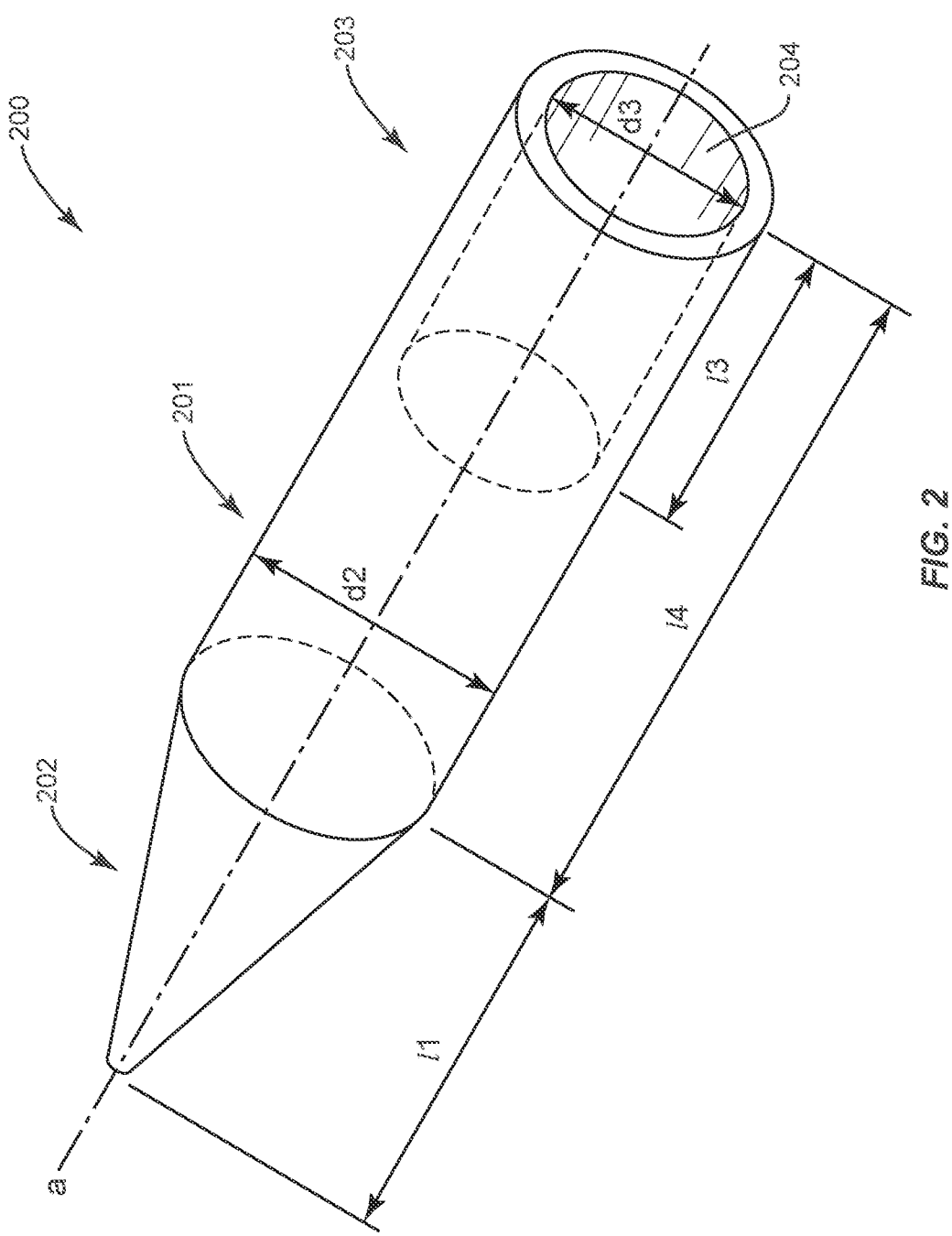
FIG. 2 is a perspective view illustrating a second embodiment of an alignment tool in accordance with aspects of the present disclosure.

FIG. 2 illustrates a second embodiment of an alignment tool in accordance with aspects of the present disclosure. The alignment tool 200 has a substantially cylindrical body 201 defined along a longitudinal axis "a". The alignment tool 200 comprises a first end 202 having a conical shape and a second end 203 defining an opening 204 therein, and the opening 204 extends into the cylindrical body 201 along the longitudinal axis "a".

The length l1 of the portion of the alignment tool 200 having the conical shape is in the range of from 0.5 to 15 inches and preferably, from 1 to 10 inches.

The length l3 of the opening 204 of the alignment tool 200 extending into the cylindrical body 201 along the longitudinal axis "a" is in the range of from 0.5 to 10 inches and preferably, from 1 to 8 inches.

The length l4 of the portion of the alignment tool 200 having the substantially cylindrical body 201 is in the range of from 0.5 to 20 inches and preferably, from 1 to 10 inches.

The diameter d2 of the substantially cylindrical body 201 of the alignment tool 200 is in the range of from 0.1 to 5 inches and preferably, from 0.2 to 4 inches.

The diameter d3 of the opening 204 of the alignment tool 200 is in the range of from 0.05 to 5 inches and preferably, from 0.1 to 4 inches.

Figure 3:
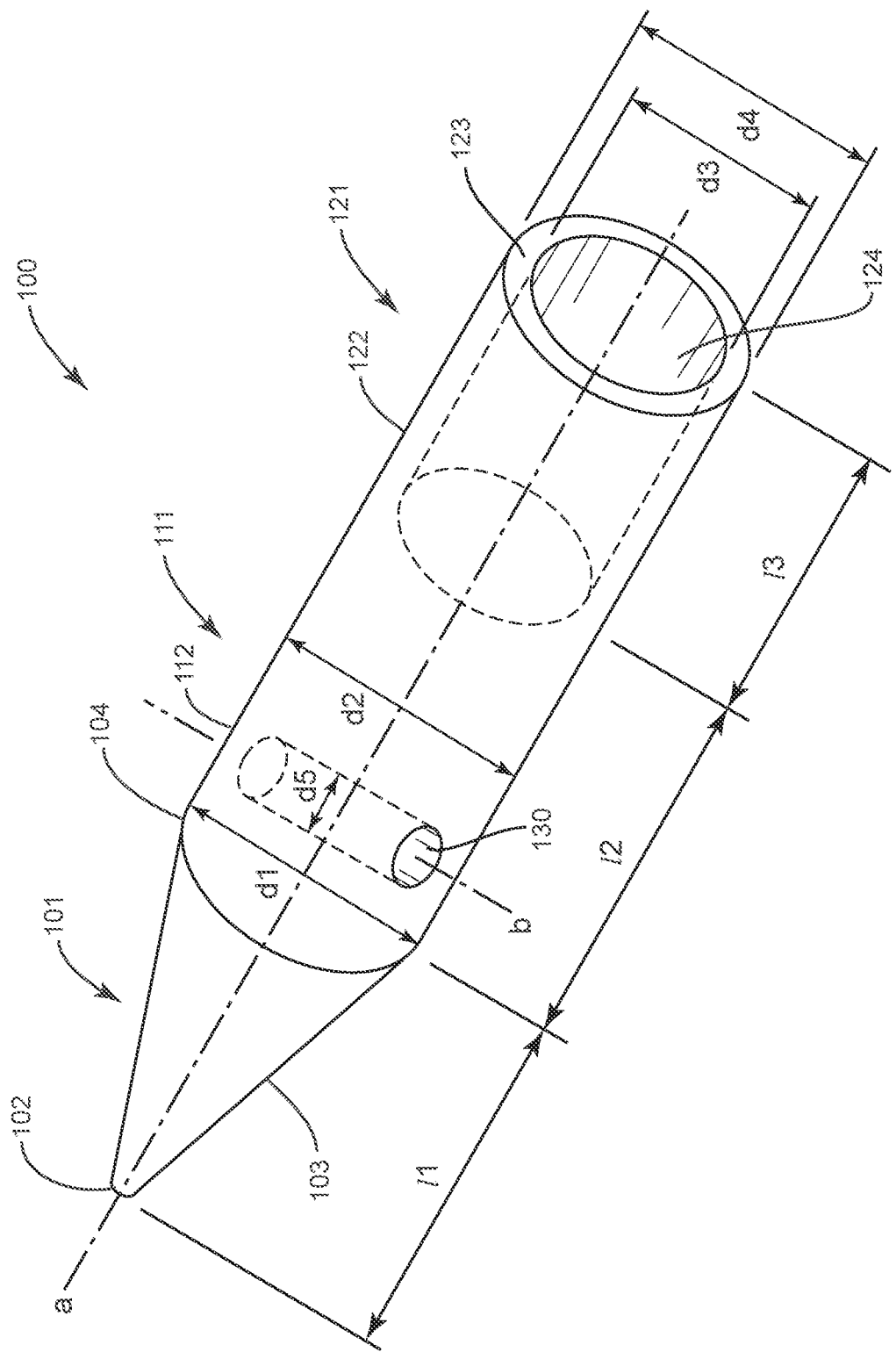
FIG. 3 is a perspective view illustrating a third embodiment of an alignment tool in accordance with aspects of the present disclosure.

FIG. 3 illustrates a third embodiment of an alignment tool in accordance with aspects of the present disclosure. The alignment tool 100 has a first solid body 101, a second solid body 111, a hollow body 121, a round apex 102, a circular body 103, a flat circular base 104, an elongated tubular body 112, a substantially cylinder body 122, a circular ring 123, a hollow space 124, a longitudinal axis "a", length l1, length l2, length l3, diameter d1, diameter d2, diameter d3 and diameter d4 as defined in connection with FIG. 1.

Moreover, the second solid body 111 has a hole 130 having an axis "b". The diameter d5 of the hole 130 of the alignment tool 100 is in the range of from 0.1 to 1 inch. The hole 130 extends in a plane substantially parallel to the flat circular base 104 of the first solid body 101 and in a direction substantially passing through the longitudinal axis "a" of the alignment tool 100, i.e., the axis "a" and axis "b" substantially cross. Hole 130 can be used to receive a removal tool to remove the alignment tool 100 after the installation of the storage rack. While hole 130 shown in FIG. 3 substantially extends through the entire second solid body 111, the hole 130 may only extend partially through the second solid body 111 as long as such extension is sufficient to receive a removal tool for easily removal of the alignment tool 100.

Figure 4:
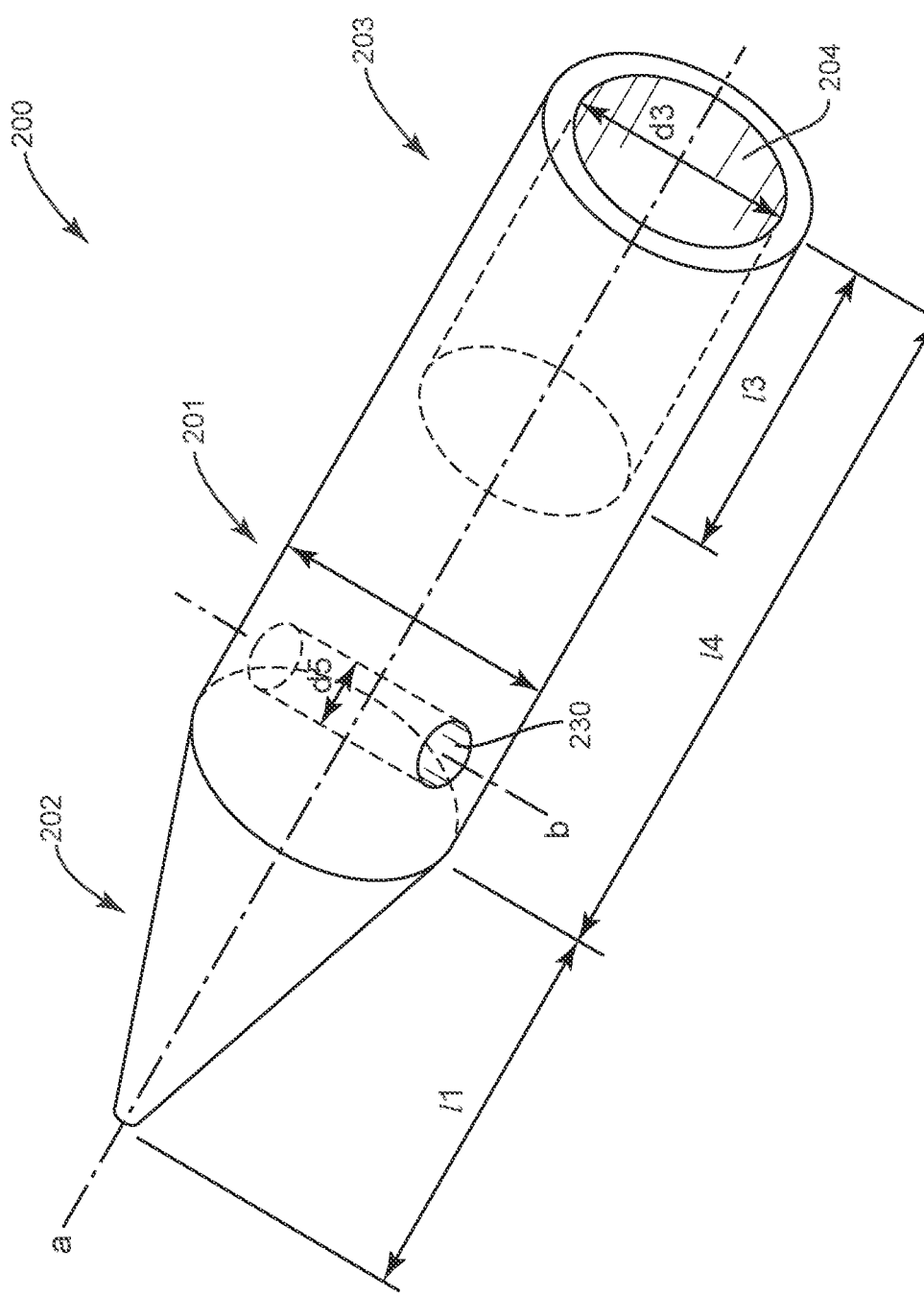
FIG. 4 is a perspective view illustrating a fourth embodiment of an alignment tool in accordance with aspects of the present disclosure.

FIG. 4 illustrates a fourth embodiment of an alignment tool in accordance with aspects of the present disclosure. The alignment tool 200 has a substantially cylindrical body 201, a first end 202, a second end 203, an opening 204, a longitudinal axis "a", length l1, length l3, length l4, diameter d2 and diameter d3 as defined in connection with FIG. 2.

Furthermore, the substantially cylindrical body 201 of the alignment tool 200 has a hole 230 having an axis "b". The diameter d5 of the hole 230 of the alignment tool 200 is in the range of from 0.1 to 1 inch. The hole 230 extends in a plane substantially perpendicular the longitudinal axis "a" of the alignment tool 200, i.e., the axis "a" and axis "b" substantially cross. Hole 230 can be used to insert a removal tool to remove the alignment tool 200 after the installation of the storage rack. While hole 230 shown in FIG. 4 substantially extends through the entire cylindrical body 201 of the alignment tool 200, the hole 230 may only extend partially through the cylindrical body 201 of the alignment tool 200 as long as such extension is sufficient to receive a removal tool for easily removal of the alignment tool 200.

Figure 5B:
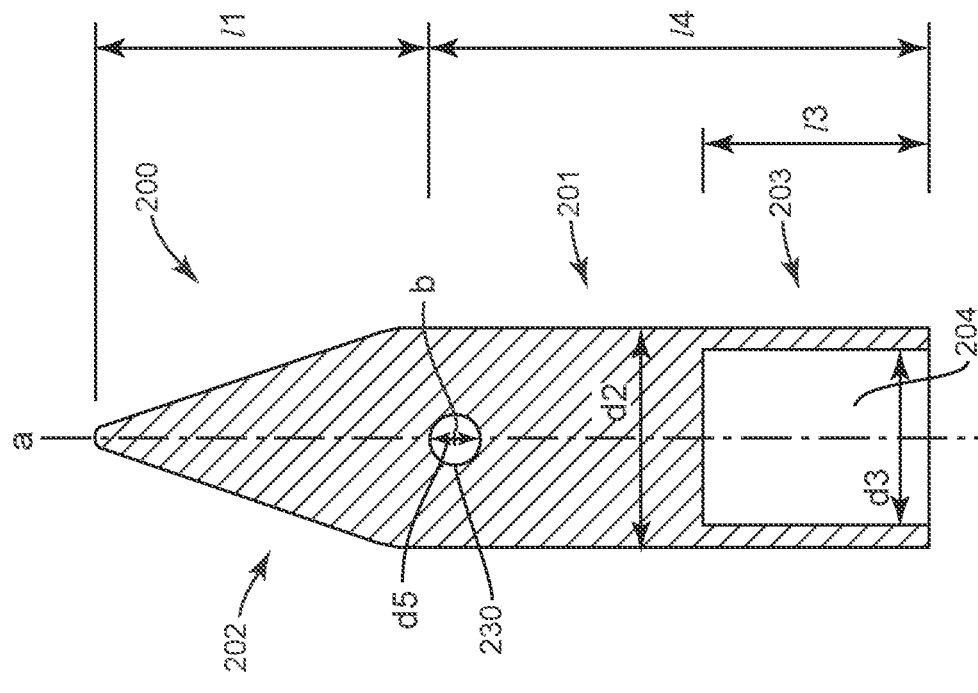
FIG. 5B is a cross sectional side view of the same embodiment of the alignment tool in accordance with aspects of the present disclosure.
Figure 5A:
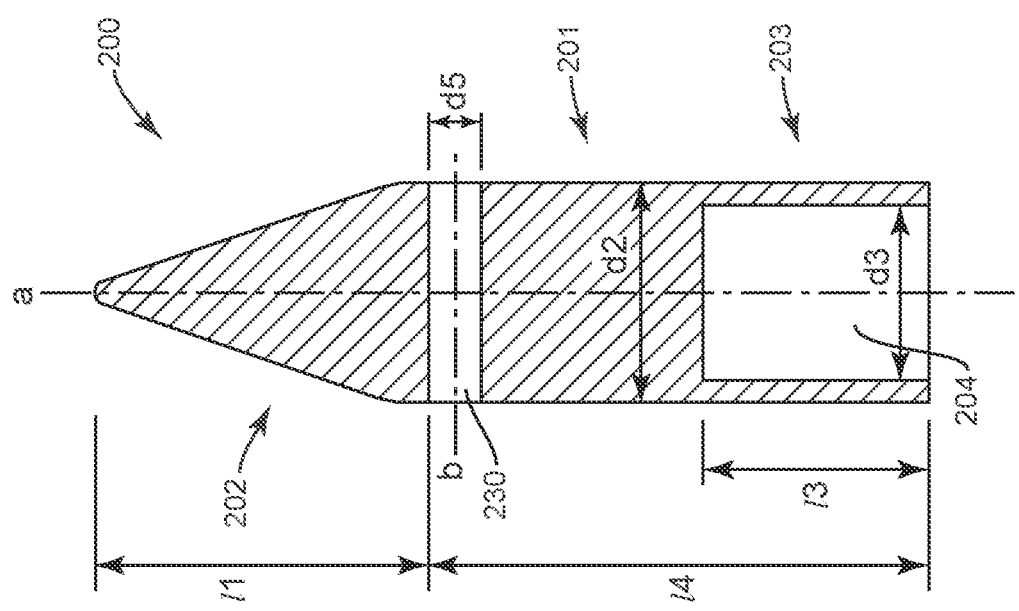
FIG. 5A is a cross sectional front view illustrating one embodiment of an alignment tool in accordance with aspects of the present disclosure.

FIG. 5A illustrates a cross sectional view of one embodiment of an alignment tool 200 in accordance with aspects of the present disclosure. Reference numbers used in FIG. 5A and FIG. 5B have been described in connection with FIG. 2. FIG. 5A is a cross-sectional view illustrating the axis "b" of the hole 230 and axis "a" of the alignment tool 200 cross. The hole 230 may either extends through the entire substantially cylindrical body 201, as shown in FIG. 5A, or only extend partially through the substantially cylindrical body 201 as long as such extension is sufficient to receive a removal tool for easily removal of the alignment tool 200. FIG. 5B illustrates another cross sectional view of one embodiment of an alignment tool 200 in accordance with aspects of the present disclosure. The cross sectional view shown in FIG. 5B is substantially perpendicular to the cross sectional view shown in FIG. 5A.

Figure 6B:
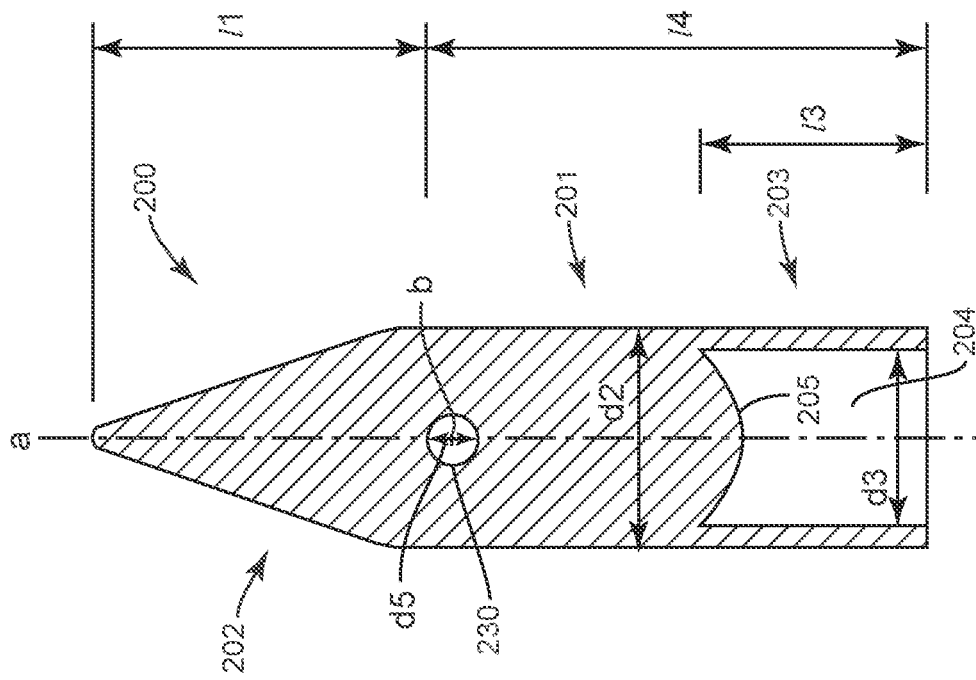
FIG. 6B is a cross sectional side view of the same embodiment of an alignment tool in accordance with aspects of the present disclosure.
Figure 6A:
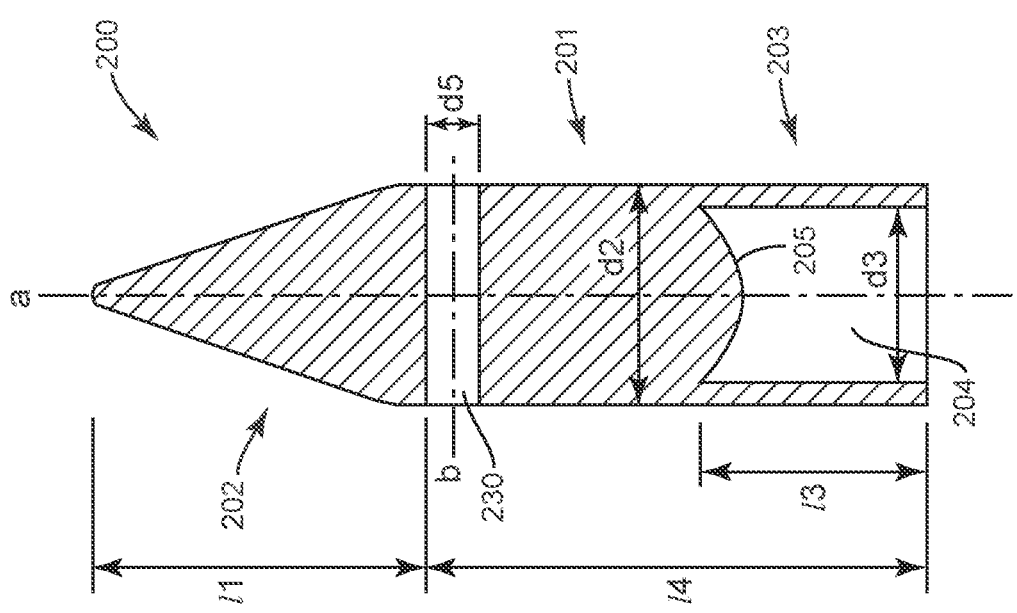
FIG. 6A is a cross sectional front view illustrating another embodiment of an alignment tool in accordance with aspects of the present disclosure.

FIG. 6A illustrates a cross sectional view of a fifth embodiment of an alignment tool 200 in accordance with aspects of the present disclosure. Reference numbers used in FIG. 6A and FIG. 6B have been described in connection with FIG. 2.

FIG. 6A and FIG. 6B are cross-sectional views that are substantially perpendicular to each other, and they illustrate that the substantially cylindrical body 201 has a convex end 205 within the opening 204, bulging in the downward direction away from the apex. In other words, the opening 204 extending into the cylindrical body 201 along the longitudinal axis "a" has a concave end at the downward end of tool 200. The utilization of convex end 205 reduces the contact surface of the top of a threaded anchor bolt with the upper end surface of the cylindrical opening of alignment tool 200. This significantly reduces the chance of potential damage to the anchor bolt when a plate impacts alignment tool 200.

Figures 7A, 7B:
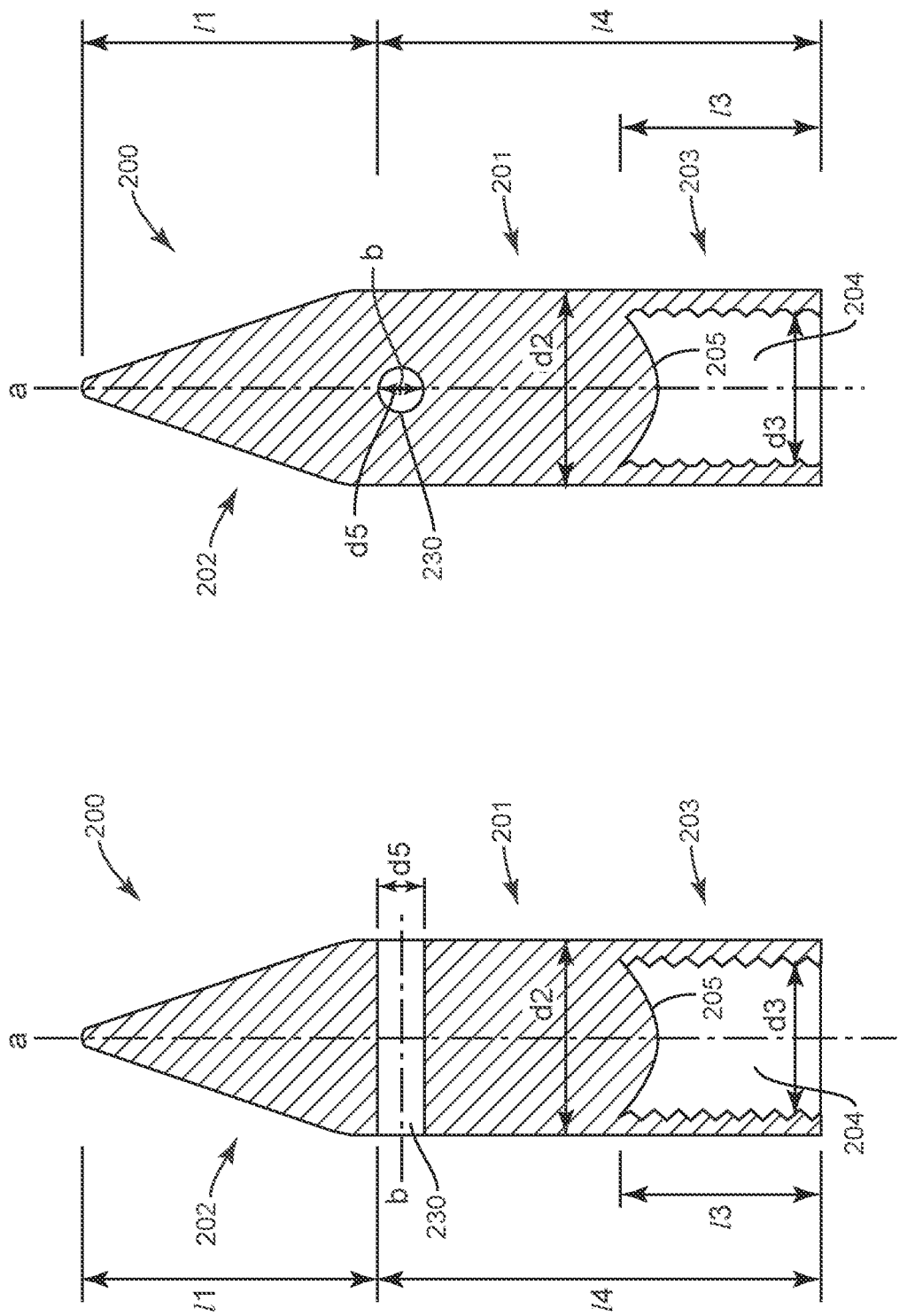
FIG. 7A is a cross sectional front view illustrating a further embodiment of an alignment tool in accordance with aspects of the present disclosure.
FIG. 7B is a cross sectional side view of the same embodiment of an alignment tool in accordance with aspects of the present disclosure.

FIG. 7A illustrates a cross sectional view of a sixth embodiment of an alignment tool 200 in accordance with aspects of the present disclosure. Reference numbers used in FIG. 7A and FIG. 7B have been described in connection with FIG. 2.

FIG. 7A and FIG. 7B are cross-sectional views that are substantially perpendicular to each other. Similar to the embodiment illustrated in FIG. 6A and FIG. 6B, the substantially cylindrical body 201 of the alignment tool 200 has a convex end 205 within the opening 204, or the opening 204 extending downward into the cylindrical body 201 along the longitudinal axis "a" with a concave end to protect the top of the threaded anchor bolt due to reduced contact surface between the bolt and the tool 200. Moreover, side walls of the opening 204 of the alignment tool 200 have internal threads. During the alignment process, the alignment tool 200 is first screwed on the threaded anchor bolt, the threads of the anchor bolt are protected by the convex end 205 and the internal threads on the side walls of the opening 204. While this embodiment of the alignment tool requires a closer fit between the alignment tool 200 and the threaded anchor bolt compared with other embodiments without threads on the side walls of the opening 204, this embodiment of the alignment tool can provide the best protection to the anchor bolt and most secure connection during the alignment and assembling process.

Figure 8:
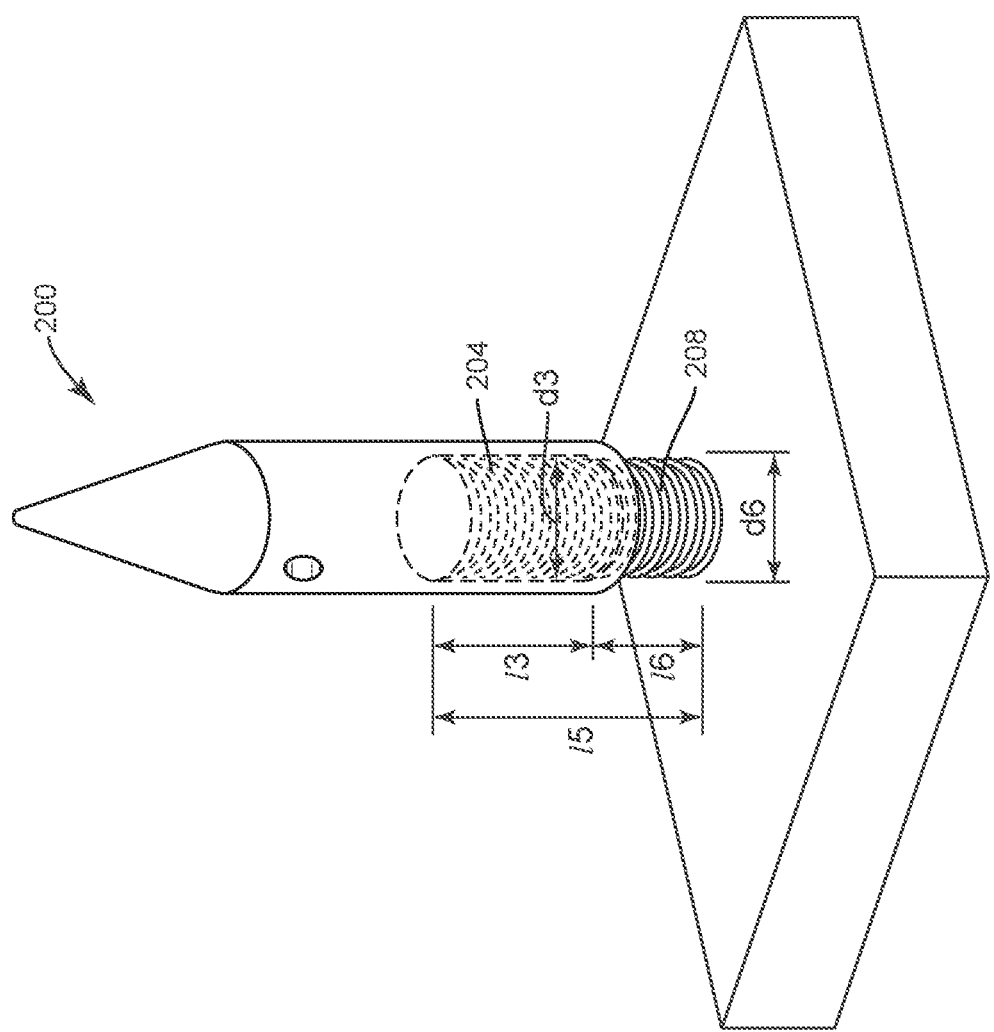
FIG. 8 illustrates one embodiment of an alignment tool being placed on a threaded anchor bolt in accordance with aspects of a method of the present disclosure.

FIG. 8 illustrates one embodiment of an alignment tool 200 being placed on a threaded anchor bolt in accordance with aspects of the present disclosure. The diameter d3 of the opening 204 of the alignment tool 200 is slightly larger than the diameter d6 of the threaded anchor bolt 208. The alignment tool 200 is positioned on the threaded anchor bolt 208 wherein the top of the opening 204 is in direct contact with the top surface of the threaded anchor bolt 208. Length l5 is the above-ground length of the threaded anchor bolt 208. Length l6 is the length of the exposed threaded anchor bolt 208, which is the difference between the above-ground length l5 of the threaded anchor bolt 208 and the length l3 of the opening 204. While length l5 of the threaded anchor bolt 208 is shown in FIG. 8 as longer than length l3 of the opening 204, the above-ground length l5 of the threaded anchor bolt 208 could be the same or even less than the length l3 of the opening 204 without sacrificing the function and utility of the alignment tool 200. When the above-ground length l5 of the threaded anchor bolt 208 is shorter than the length l3 of the opening 204, the threaded anchor bolt 208 has no exposed threads.

FIG. 9A illustrates a cross sectional view of one embodiment of an alignment tool being placed on a threaded anchor bolt in accordance with aspects of the present disclosure. Axis "b" of the hole 230 is substantially perpendicular to this cross sectional view. The threaded anchor bolt 208 is deeply embedded in the floor and the threads are covered and protected by the opening 204 of the alignment tool 200. FIG. 9B illustrates a cross sectional view of a storage rack being installed through the alignment tool 200 and the threaded anchor bolt 208 in accordance with aspects of the present disclosure. The height h1 is the height of the base plate 350 of a storage rack having a hole 351. The length l6 of the exposed threaded anchor bolt needs to be shorter than the height h1 of the base place 350, so that the opening 204 of the alignment tool 200 covers the threads having substantially the same length as the length l3 of the opening 204 and provides protection to the covered threads during the alignment process.

Figure 10G:
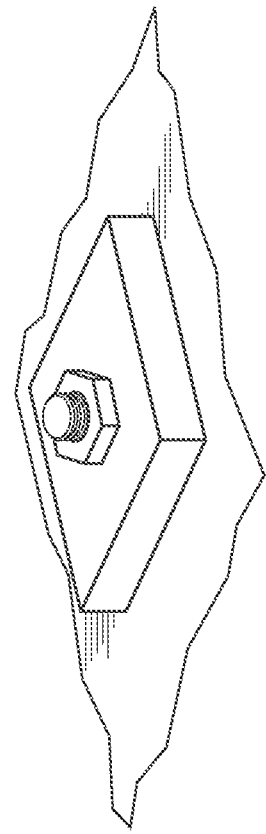

FIGS. 10A-10G illustrate the method of using one embodiment of an alignment tool in the installation and fastening of a storage rack plate over a threaded anchor bolt 208 deeply embedded in the floor, as shown in FIG. 10A. An alignment tool 200 in accordance with aspects of the present disclosure is placed over threaded anchor bolt 208 as shown in FIG. 10B. FIG. 10C shows a base plate 350 of a storage rack being aligned and ready to be lowered towards the alignment tool 200. FIG. 10D(a) shows the base plate 350 of the storage rack being unintentionally slightly off-center aligned with the alignment tool 200.

As shown in FIG. 10D(a), the apex of first end 202 of the alignment tool 200 enters the hole 351 on the base plate 350 of the storage rack. The apex of the alignment tool 200 is positioned off-center within the hole 351. As the storage rack lowers, the apex of the alignment tool 200 enters the hole 351 on the storage rack, and the conical and/or sloped inclined shaped body of the first end 202 of the alignment tool 200 may be in contact with the cylindrical wall of the hole 351 on the storage rack.

FIG. 10D(b) is a force diagram to illustrate the forces acting on the alignment tool 200 by the base plate 350 of the storage rack. As shown in FIG. 10D(b), at the contact point 352 of the first end 202 of the alignment tool 200 and the cylindrical wall of the hole 351 on the storage rack, the weight of the storage rack creates a gravity force G downwards paralleling to the longitudinal axis "a". The heavier the storage rack, the larger the gravity force G. The gravity force G can be decomposed into two orthogonal components: a normal force Gn which is perpendicular to the conical shaped body of the first end 202 of the alignment tool 200 at the contact point 352 and a parallel force Gp which is parallel to the surface of the conical shaped body of the first end 202 of the alignment tool 200 at the contact point 352. The conical shaped body of the first end 202 of the alignment tool 200 in turn supplies a normal force Fn which is perpendicular to the surface of conical shaped body of the first end 202 of the alignment tool 200 at the contact point 352 and substantially equals to the normal force Gn. As the storage rack lowers, a friction force Ff is created between the sloped/inclined surface of the conical shaped body of the first end 202 of the alignment tool 200 and the surface of the cylindrical wall of the hole 351 on the storage rack. Since the surface of the first end 202 of the alignment tool 200 and the surface of the cylindrical wall of the hole 351 on the storage rack are both smooth surfaces, the friction force Ff is smaller than the parallel force Gp, especially for very heavy storage racks, resulting in a net force F, i.e., the difference between the parallel force Gp and the friction force Ff, in the direction of the parallel force Gp. The net force F is the actual force that guides the storage rack through the conical shape of the first end 202 of the alignment tool 200 when the alignment tool 200 is positioned off-center within the hole 351.

FIG. 10E(a) illustrates a cross sectional view of a storage rack being installed through the body of the alignment tool in accordance with aspects of the present disclosure. As shown in a cross sectional view of FIG. 10E(1), once the hole 351 on the storage rack has completely passed around the conical shaped portion of the alignment tool 200, the cylindrical wall of the hole 351 on the storage rack may occasionally being in contact with the surface of the alignment tool 200. FIG. 10E(b) is a force diagram to illustrate the forces acting on the alignment tool by the storage rack. The gravity force G downwards paralleling to the longitudinal axis "a" remains the same. When the occasional contact of the cylindrical wall of the hole 351 on the storage rack and the surface of the alignment tool 200 happens, the surface of the alignment tool 200 provides a friction force Ff' and a normal force Fn'. The friction force Ff' is very small due to the smooth surface as discussed above. The net force F', i.e, the difference between the gravity force G and the friction force Ff', is the actual force that lowers the storage rack through the rest of the alignment tool 200. The normal force Fn' guides the hole 351 of the storage rack substantially around the alignment tool 200. For example, if the hole 351 of the storage rack is off-centered and touches the alignment tool 200, the normal force Fn' would push the storage rack in the opposite direction to re-center the hole 351 of the storage rack.

Figure 10F:
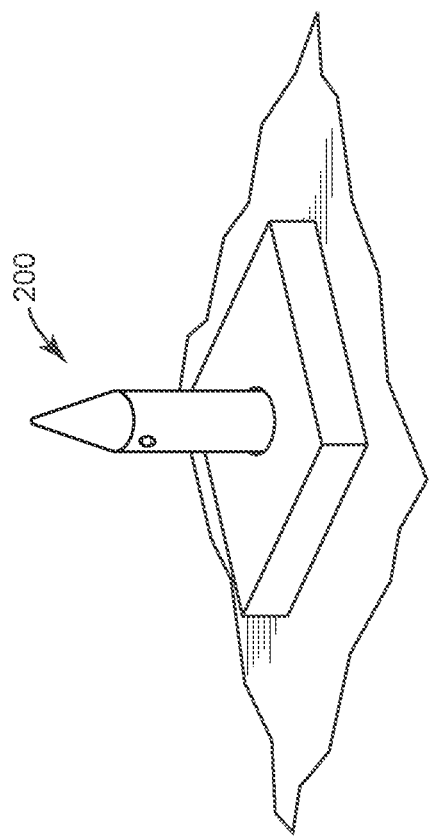

FIG. 10F shows a storage rack being placed on and secured to the floor without damaging the threaded anchor bolt extending from the floor. FIG. 10G shows an alignment tool being removed and a nut being screwed on the anchor bolt to secure the storage rack. Subsequently, the alignment tool is being removed and a nut is being screwed on the anchor bolt 208 to secure the storage rack, as shown in FIG. 10G.

Figure 11:
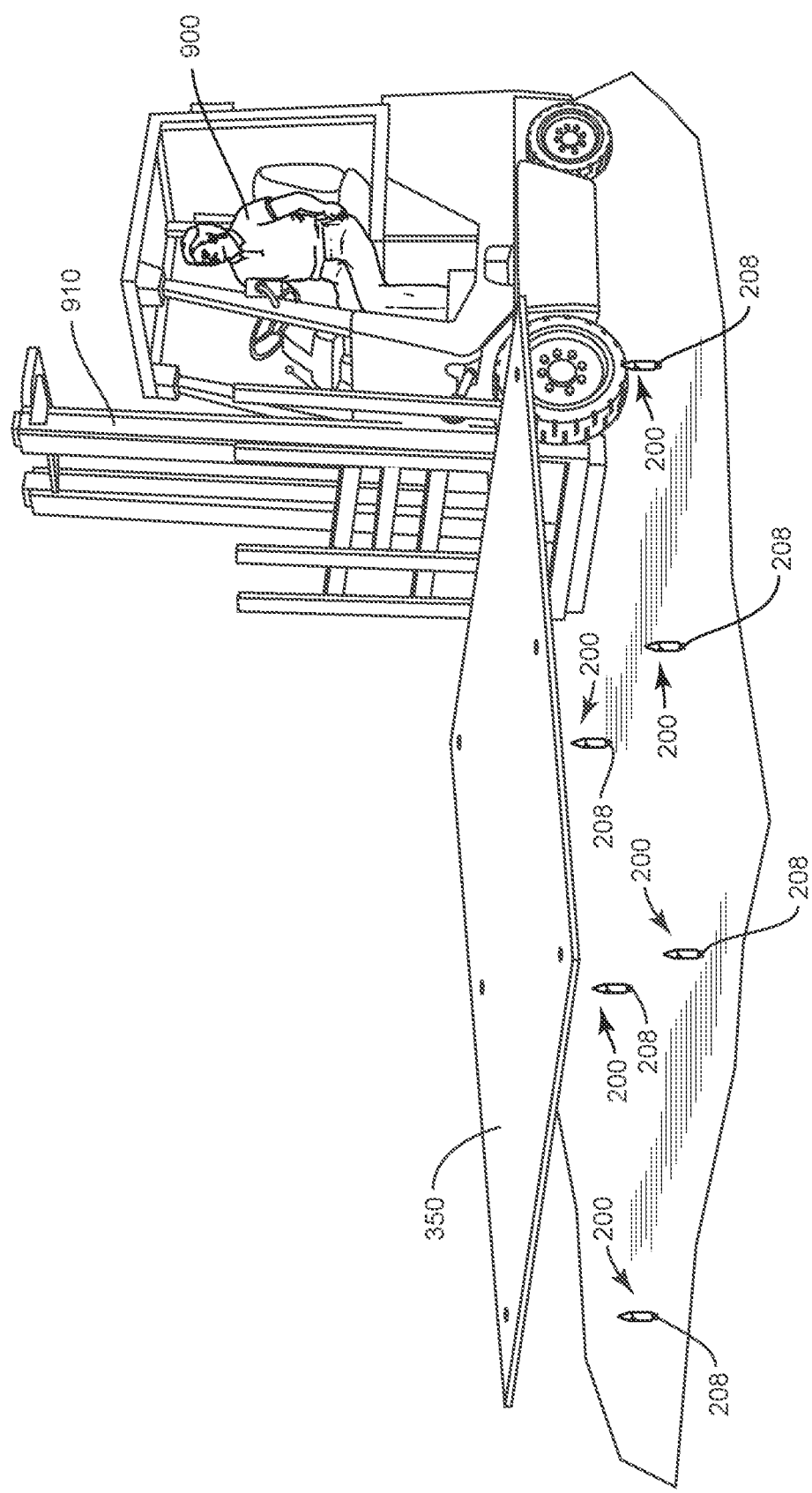
FIG. 11 is a perspective view illustrating a storage rack plate installation using the alignment tools in accordance with aspects of the present disclosure.

FIG. 11 illustrates the scale of the storage rack installation using the alignment tools in accordance with aspects of the present disclosure. FIG. 11 shows an operator 900 of a forklift 910 in the process of installing a heavy storage rack plate having multiple holes substantially evenly spaced along the edges of the base plate 350 of the storage rack into multiple fixed in ground anchor bolts 208 protected by the alignment tools 200.

The present disclosure is advantageous because the alignment tool is universal in that a single steady tool may be manufactured and used for align the storage racks during the installation process. The alignment tool can be easily removed after the storage racks are installed.

The alignment tool can be fabricated from suitable materials, including, but not limited to, metal(s), alloy(s), or combinations thereof, etc. Suitable metals include aluminium, copper, iron, tin, lead, titanium, zinc and etc. Suitable alloys including steel, solder, brass, pewter, duralumin, bronze, amalgams and etc. The alignment tool may be fabricated from a single material or a combination of materials, including, but not limited to, the above exemplary materials, to achieve various desired characteristics such as strength, rigidity, performance and durability.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method of installing a base of a commercial storage system having at least one bolt receiving hole, over at least one bolt fixed to and extending in an upward direction from a floor, the method comprising:
   installing a protective body having a longitudinal axis over the bolt, the protective body extending upward from a bottom to a top opposite the bottom, the protective body expanding downwards and outwards away from the longitudinal axis, from the top to a main body portion between the top and the bottom, the main body portion having a hollow bolt receiving recess extending upward from the bottom along the longitudinal axis, the protective body installed by positioning the hollow recess over the bolt;
   lowering the bolt receiving hole of the base over the protective body; and
   removing the protective body from the bolt and bolt receiving hole.

2. The method of claim 1, wherein the hollow recess is threaded and the protective body is installed over the bolt by screwing the protective body onto the bolt.

3. The method of claim 1, wherein the protective body is positioned 0.5 to 10 inches over the bolt.

4. The method of claim 1, wherein the protective body is positioned 1 to 8 inches over the bolt.

5. The method of claim 1, wherein the top is rounded.

6. The method of claim 1, wherein an upper portion of the protective body is conical.

7. The method of claim 1, wherein an upper portion of the hollow recess has a convex bulge with a downward pointing apex extending down towards the bottom, and the protective body is installed over the bolt with the convex bulge contacting less than an entire upper surface of the bolt.

8. The method of claim 7, wherein the hollow recess is threaded and the protective body is installed over the bolt by screwing the protective body onto the bolt until the convex bulge contacts the top surface of the bolt.

9. The method of claim 1, wherein the protective body includes a tool receiving recess, and a tool is inserted into the tool receiving recess to assist with the step of removing the protective body from the bolt.

10. The method of claim 9, wherein the tool receiving recess comprises a hole through the protective body.

11. The method of claim 2, wherein the tool receiving recess comprises a hole through the protective body and the protective body is unscrewed by inserting a tool into the tool receiving recess and turning the tool to turn the protective body.

12. The method of claim 1, wherein the base weighs over 1000 pounds.

13. The method of claim 12, wherein the protective body is formed from materials and dimensioned to protect a bolt from damage, when impacted by the base as it is lowered over the protective body.

14. The method of claim 1, wherein the main body portion has a substantially cylindrical outer shape.

15. The method of claim 1, wherein the protective body is formed of metal.

16. The method of claim 1, wherein the protective body is formed of steel.

17. The method of claim 1, wherein after the base is lowered over the protective body, a lower portion of the protective body extends into the bolt receiving hole, with the lower portion between the bolt and an inside surface of the bolt receiving hole.

18. The method of claim 1, wherein the base is lowered over the protective body with a forklift.

19. A method of installing a base of a storage system having a plurality of bolt receiving holes over a plurality of respective bolts embedded in a floor, with each bolt extending in an upward direction from the floor, the method comprising:
- installing a respective protective body over each the bolts, each protective body having a top at an upward end of the protective body and a bottom opposite the top, the protective body tapering outwards and downwards from the top to a main body portion between the top and the bottom, the main body portion having hollow recess extending upward from the bottom, the protective body installed by positioning the hollow recess of each protective body over each of the respective bolts;
- lowering the bolt receiving holes of the base over the respective protective bodies; and
- removing the protective bodies from the respective bolts.

20. The method of claim 19, wherein the base is lowered over the protective bodies with a forklift.

\* \* \* \* \*